(12) United States Patent
Wu et al.

(10) Patent No.: US 11,601,154 B2
(45) Date of Patent: Mar. 7, 2023

(54) MULTI-CHIP INTEGRATED CIRCUIT AND INTERACTIVE COMMUNICATION METHOD FOR THE SAME

(71) Applicant: SILERGY SEMICONDUCTOR TECHNOLOGY (HANGZHOU) LTD, Zhejiang (CN)

(72) Inventors: Chuanxin Wu, Zhejiang (CN); Qinfen Hu, Zhejiang (CN)

(73) Assignee: SILERGY SEMICONDUCTOR TECHNOLOGY (HANGZHOU) LTD, Hangzhou (CN)

( * ) Notice: Subject to any disclaimer, the term of this patent is extended or adjusted under 35 U.S.C. 154(b) by 0 days.

(21) Appl. No.: 17/405,886

(22) Filed: Aug. 18, 2021

(65) Prior Publication Data
US 2022/0060212 A1 Feb. 24, 2022

(30) Foreign Application Priority Data
Aug. 21, 2020 (CN) .......................... 202010849531.3

(51) Int. Cl.
*H04B 1/40* (2015.01)
*H01M 10/42* (2006.01)
*H01M 10/48* (2006.01)

(52) U.S. Cl.
CPC .......... *H04B 1/40* (2013.01); *H01M 10/4257* (2013.01); *H01M 10/48* (2013.01); *H01M 2010/4271* (2013.01)

(58) Field of Classification Search
CPC .... H04B 1/40; H01M 10/4257; H01M 10/48; H01M 2010/4271
See application file for complete search history.

(56) References Cited

U.S. PATENT DOCUMENTS

| | | | |
|---|---|---|---|
| 9,759,781 B2 | 9/2017 | Ohtake | |
| 2005/0242776 A1* | 11/2005 | Emori | B60L 58/22 320/116 |
| 2010/0001737 A1* | 1/2010 | Kubo | H02J 7/0047 324/434 |
| 2013/0187610 A1* | 7/2013 | Hayashi | H02J 7/00 320/118 |

(Continued)

FOREIGN PATENT DOCUMENTS

| | | |
|---|---|---|
| CN | 2753063 Y | 1/2006 |
| CN | 102231549 A | 11/2011 |

(Continued)

*Primary Examiner* — Jaison Joseph
(74) *Attorney, Agent, or Firm* — Harness, Dickey & Pierce, P.L.C.

(57) ABSTRACT

A multi-chip integrated circuit and an interactive communication method for the multi-chip integrated circuit are provided. The multi-chip integrated circuit includes multiple low-voltage chips connected in series with each other instead of an ultra-high voltage chip, to reduce requirements on technology for the chip. In addition, the multiple chips communicate with each other through internal communication ports based on a differential signal, to enhance reliability of communication. Two adjacent chips are connected in series and a low-voltage power supply is arranged, so that a voltage difference between communication ports of the two adjacent chips is small.

19 Claims, 3 Drawing Sheets

(56) References Cited

U.S. PATENT DOCUMENTS

| | | | |
|---|---|---|---|
| 2013/0307551 A1* | 11/2013 | Makino | G01R 31/396 |
| | | | 324/434 |
| 2014/0129164 A1* | 5/2014 | Gorbold | G01R 31/3835 |
| | | | 702/63 |
| 2015/0241520 A1 | 8/2015 | Ohtake | |
| 2017/0033574 A1* | 2/2017 | Imaizumi | H02J 7/0029 |
| 2018/0233928 A1* | 8/2018 | Li | H01M 10/48 |
| 2019/0086475 A1* | 3/2019 | Takeshita | G01R 31/396 |
| 2019/0285699 A1* | 9/2019 | Weidner | G01R 31/3648 |
| 2022/0060212 A1* | 2/2022 | Wu | H01M 10/4257 |
| 2022/0149635 A1* | 5/2022 | Ryu | H01M 10/482 |

FOREIGN PATENT DOCUMENTS

| | | |
|---|---|---|
| CN | 103217605 A | 7/2013 |
| CN | 104865531 A | 8/2015 |
| CN | 209842553 U | 12/2019 |

\* cited by examiner

MULTI-CHIP INTEGRATED CIRCUIT AND INTERACTIVE COMMUNICATION METHOD FOR THE SAME

The present application claims priority to Chinese Patent Application No. 202010849531.3, titled "MULTI-CHIP INTEGRATED CIRCUIT AND INTERACTIVE COMMUNICATION METHOD FOR THE SAME", filed on Aug. 21, 2020 with the China National Intellectual Property Administration, which is incorporated herein by reference in its entirety.

FIELD

The present disclosure relates to the technical field of power electronics, and in particular to a multi-chip integrated circuit applicable to a power supply and an interactive communication method for the multi-chip integrated circuit.

BACKGROUND

Figure 1:
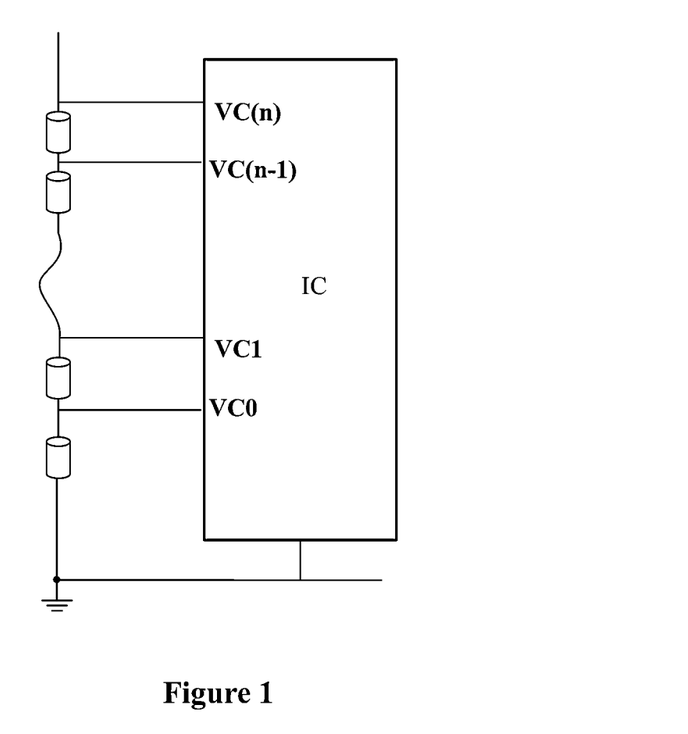
FIG. 1 is a structural block diagram of a battery management circuit according to the conventional technology.

Reference is made to FIG. 1, which is a structural block diagram of a battery management circuit according to the conventional technology. A chip IC is configured to monitor voltages of M batteries. If each of the voltages of the M batteries has a maximum of 6V, a voltage that a port VC(n) bears reaches to (6*M)V. In an application scenario of multiple batteries connected in series such as an automobile, the port VC(n) may bear a maximum voltage of greater than 100V. In this case, requirements on technology of the chip IC are extremely high, resulting in a significant increase in cost.

SUMMARY

In view of this, a multi-chip integrated circuit and an interactive communication method for the multi-chip integrated circuit are provided according to the present disclosure, to reduce the requirements on the technology of the chip IC only by adding internal communication ports.

An interactive communication method for a multi-chip integrated circuit is provided according to a first aspect. The interactive communication method includes:

performing communication between a first chip and a second chip through at least two groups of communication ports, where the first chip is connected in series with the second chip, and is adjacent to the second chip.

Each of the first chip and the second chip includes: a transmitting circuit corresponding to the first group of communication ports; a receiving circuit corresponding to the second group of communication ports; and a low-voltage power supply for supplying power to the transmitting circuit and the receiving circuit, to reduce a voltage difference between communication ports of the two chips.

In an embodiment, each of the two groups of communication ports transmit a differential signal.

In an embodiment, the transmitting circuit in the first chip transmits a first signal through the first group of communication ports, where the first group of communication ports are a group of transmitting communication ports; and the receiving circuit in the second chip receives the first signal through a group of receiving communication ports. The receiving circuit in the first chip receives a second signal through the second group of communication ports, where the second group of communication ports are a group of receiving communication ports; and the transmitting circuit in the second chip transmits the second signal through a group of transmitting communication ports.

In an embodiment, the first chip is arranged downstream of the second chip, and a grounding end of the second chip is connected to a power supply end of the first chip.

In an embodiment, the low-voltage power supply in the first chip lowers a voltage at a common end between the power supply end of the first chip and the grounding end of the second chip by a first threshold, to supply power to the transmitting circuit and the receiving circuit in the first chip. The low-voltage power supply in the second chip boosts a voltage at the common end between the grounding end of the second chip and the power supply end of the first chip by a second threshold, to supply power to the transmitting circuit and the receiving circuit in the second chip.

In an embodiment, the first threshold is equal to the second threshold, the first threshold is less than a voltage at a power supply end of the first chip, and the second threshold is less than a voltage at a power supply end of the second chip.

In an embodiment, the transmitting circuit and the receiving circuit in the first chip are connected between an output end of the low-voltage power supply in the first chip and the power supply end of the first chip. The transmitting circuit and the receiving circuit in the second chip are connected between an output end of the low-voltage power supply in the second chip and the grounding end of the second chip.

In an embodiment, each of the first and second chips is connected to a node of a module formed by a plurality of loads connected in series, to reduce a maximum voltage that each of the first and second chips bears.

A multi-chip integrated circuit is provided according to a second aspect. The multi-chip integrated circuit includes at least two chips. The at least two chips are connected in series, and each of the at least two chips is configured to communicate with a chip among the at least two chips that is adjacent to the chip.

Each of the at least two chips includes a first communication module, a second communication module, a first group of communication ports, a second group of communication ports, a third group of communication ports, and a fourth group of communication ports. The first communication module is configured to communicate with a chip arranged upstream of the chip. The second communication module is configured to communicate with a chip arranged downstream of the chip.

Each of the first communication module and the second communication module includes: a transmitting circuit; a receiving circuit; and a low-voltage power supply configured to supply power to the transmitting circuit and the receiving circuit.

The first group of communication ports corresponds to the transmitting circuit in the first communication module. The second group of communication ports corresponds to the receiving circuit in the first communication module. The third group of communication ports corresponds to the transmitting circuit in the second communication module. The fourth group of communication ports corresponds to the receiving circuit in the second communication module.

In an embodiment, each of the first, second, third and fourth groups of communication ports are configured to transmit a differential signal.

In an embodiment, the transmitting circuit in the first communication module is configured to transmit a first signal through the first group of communication ports. The first group of communication ports are a group of transmitting communication ports. The receiving circuit corresponding in the second communication module in the chip arranged upstream of the chip is configured to receive the first signal through the fourth group of communication ports. The fourth group of communication ports are a group of receiving communication ports. The receiving circuit in the first communication module is configured to receive a second signal through the second group of communication ports. The second group of communication ports are a group of receiving communication ports. The transmitting circuit in the second communication module in the chip arranged upstream of the chip is configured to transmit the second signal through the third group of communication ports. The third group of communication ports are a group of transmitting communication ports.

In an embodiment, for each of the at least two chips, a grounding end of the chip is connected to a power supply end of a chip arranged downstream of the chip, and a power supply end of the chip is connected to a grounding end of a chip arranged upstream of the chip.

In an embodiment, the low-voltage power supply in the first communication module is configured to lower a voltage at a common end between the power supply end of the chip and the grounding end of the chip arranged upstream of the current chip by a first threshold, to supply power to the transmitting circuit and the receiving circuit in the first communication module. The low-voltage power supply in the second communication module is configured to boost a voltage at a common end between the grounding end of the chip and the power supply end of the chip arranged downstream of the chip by a second threshold, to supply power to the transmitting circuit and the receiving circuit in the second communication module.

In an embodiment, the first threshold is equal to the second threshold, the first threshold is less than a voltage at the power supply end of the chip, and the second threshold is less than a voltage at the power supply end of the chip arranged downstream of the chip.

In an embodiment, the transmitting circuit and the receiving circuit in the first communication module are connected between an output end of the low-voltage power supply in the first communication module and the power supply end of the chip. The transmitting circuit and the receiving circuit in the second communication module are connected between an output end of the low-voltage power supply in the second communication module and the grounding end of the chip.

A circuit for monitoring a battery voltage is provided according to a third aspect.

The circuit for monitoring a battery voltage includes: a battery load formed by multiple batteries connected in series; and the multi-chip integrated circuit described above.

A chip is provided according to a fourth aspect. The chip is applicable to a multi-chip integrated circuit The chip includes a first communication module, a second communication module, a first group of communication ports, a second group of communication ports, a third group of communication ports, and a fourth group of communication ports. The first communication module is configured to communicate with a chip arranged upstream of the chip. The second communication module is configured to communicate with a chip arranged downstream of the chip. Each of the first communication module and the second communication module includes: a transmitting circuit; a receiving circuit; and a low-voltage power supply configured to supply power to the transmitting circuit and the receiving circuit.

The first group of communication ports corresponds to the transmitting circuit in the first communication module. The second group of communication ports corresponds to the receiving circuit in the first communication module. The third group of communication ports corresponds to the transmitting circuit in the second communication module. The fourth group of communication ports corresponds to the receiving circuit in the second communication module.

In an embodiment, each of the first, second, third and fourth groups of communication ports are configured to transmit a differential signal.

In an embodiment, the four groups of communication ports are ports for transmitting a differential signal.

In an embodiment, the low-voltage power supply in the first communication module is configured to lower a voltage at a common end between the power supply end of the chip and the grounding end of the chip arranged upstream of the current chip by a first threshold, to supply power to the transmitting circuit and the receiving circuit in the first communication module. The low-voltage power supply in the second communication module is configured to boost a voltage at a common end between the grounding end of the chip and the power supply end of the chip arranged downstream of the chip by a second threshold, to supply power to the transmitting circuit and the receiving circuit in the second communication module.

The multi-chip integrated circuit according to the present disclosure includes multiple low-voltage chips that are connected in series instead of an ultra-high voltage chip, so that requirements on technology of the chip are reduced. In addition, the multiple chips communicate with each other through internal communication ports based on a differential signal, to enhance reliability of communication. Two adjacent chips are connected in series and a low-voltage power supply is arranged, so that a voltage difference between communication ports of the two adjacent chips is small.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION OF EMBODIMENTS

The present disclosure is described below based on embodiments, and the present disclosure is not limited to these embodiments. In the following description of the present disclosure, specific details are described. The present disclosure can be fully understood by those skilled in the art without the description of these details. Well-known methods, processes, flows, components and circuits are not described in detail to avoid obscuring the essence of the present disclosure.

In addition, those skilled in the art should understand that the drawings are provided herein for illustration, and are unnecessarily drawn to scale.

In addition, it should be understood that in the following description, the term "circuit" indicates a conductive loop formed by at least one element or sub-circuit through electrical connection or electromagnetic connection. When an element or circuit is described as "connected to" another element or when an element or circuit is described as "connected" between two nodes, the element or circuit is coupled or connected to another element directly or via other element. The connection between elements is physical, logical, or a combination thereof. In addition, when an element is described as "directly coupled" or "directly connected" to another element, there is no element between the element and another element.

Unless explicitly indicated herein, the words "including", "comprising" and the like in the specification and the claims, should be interpreted as inclusive rather than exclusive or exhaustive, that is, "including but not limited to".

In the description of the present disclosure, it should be understood that, the terms "first", "second" and the like are used only for illustrative and cannot be construed as indicating or implying relative importance. In addition, in the description of the present disclosure, the term "multiple" or "a plurality of" indicates two or more unless otherwise specified.

Figure 2:
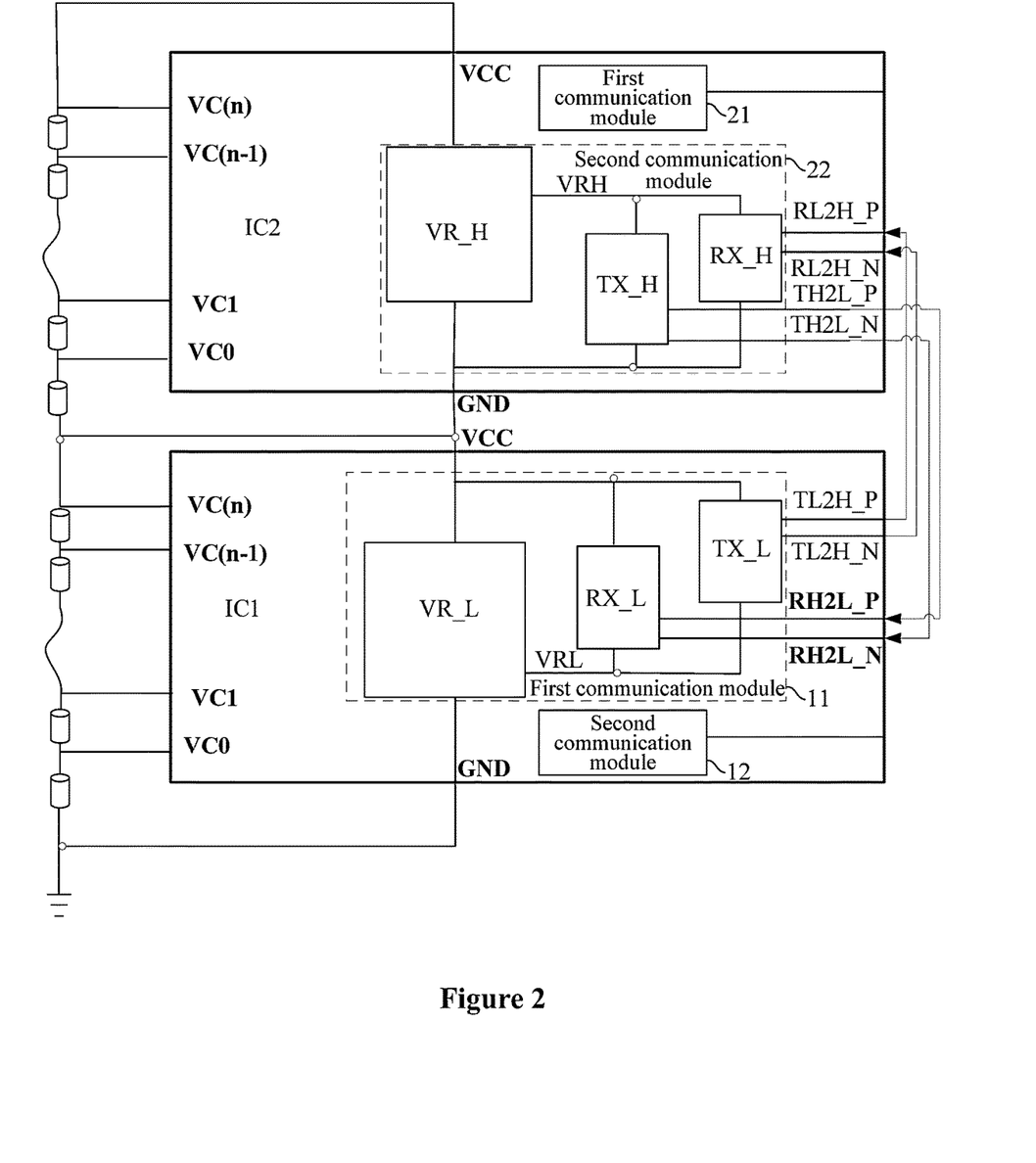
FIG. 2 is a structural diagram of a first example multi-chip integrated circuit according to the embodiments of the present disclosure.

FIG. 2 is a structural diagram of a first example multi-chip integrated circuit according to the embodiments of the present disclosure. As show in FIG. 2, in the multi-chip integrated circuit according to the present disclosure, at least two chips are integrated into a circuit module. The at least two chips are connected in series so as to reduce a maximum voltage that each of the chips bears. In addition, in the embodiment, for each of the at least two chips, multiple loads are connected in series between a power supply end and a grounding end of the chip. In addition, all the multiple loads are connected in series. The load herein is, for example, a battery. Each of the chips includes multiple detection ports. For example, the number of the detection ports is n+1 (that is, VC0 to VC(n)), and the multiple detection ports are connected to positive terminals of the multiple batteries to detect voltages of the multiple batteries, respectively.

An interactive communication method for the multi-chip integrated circuit is provided according to the present disclosure. Internal communication ports are arranged in each chip, so that these chips interact with each other, thereby reducing requirements on technology of the chip.

Specifically, for two adjacent chips in the multi-chip integrated circuit, one of the two adjacent chips communicates with the other of the two adjacent chips through at least two groups of communication ports. Each of the chips includes a transmitting circuit and a receiving circuit corresponding to the two groups of communication ports, and includes a low-voltage power supply for supplying power to the transmitting circuit and the receiving circuit, thereby reducing a voltage difference between communication ports of the two adjacent chips.

It should be noted that each of the chips is required to communicate with an upstream chip adjacent to the chip and a downstream chip adjacent to the chip. Therefore, the chip includes two communication modules. Each of the two communication modules includes the low-voltage power supply, the transmitting circuit and the receiving circuit described above. The two communication modules are a first communication module for communicating with the upstream chip and a second communication module for communicating with the downstream chip.

Specifically, each of the communication modules includes a transmitting circuit for transmitting a signal to a chip adjacent to the chip through a group of transmitting communication ports. Each of the communication modules further includes a receiving circuit for receiving a signal from the chip adjacent to the chip through a group of receiving communication ports.

In the present disclosure, two adjacent chips are connected in series. That is, a grounding end of the upstream chip is connected to a power supply end of the downstream chip. In addition, in each of the chips, the low-voltage power supply is connected between the power supply end and the grounding end of the chip, to supply power to the transmitting circuit and the receiving circuit, thereby reducing a voltage difference between communication ports of the two adjacent chips.

Specifically, in the first communication module for communicating with the upstream chip of the current chip, the power supply end of the current chip is connected with the grounding end of the upstream chip, so that the low-voltage power supply lowers a voltage at a common end between the power supply end of the current chip and the grounding end of the upstream chip by a first threshold, to supply power to the transmitting circuit and the receiving circuit in the current chip. In the second communication module for communicating with the downstream chip of the current chip, the grounding end of the current chip is connected with the power supply end of the downstream chip, so that the low-voltage power supply boosts a voltage at a common end between the grounding end of the current chip and the power supply end of the downstream chip by a second threshold, to supply power to the transmitting circuit and the receiving circuit in the current chip. In this way, the voltage difference between communication ports of the two adjacent chips is a sum of the first threshold and the second threshold. In an embodiment, the first threshold is equal to the second threshold. The first threshold and the second threshold both are less than a power supply voltage (VCC-GND) of a corresponding chip. Further, in the first communication module, the transmitting circuit and the receiving circuit are connected between the power supply end of the chip and an output end of the low-voltage power supply. In the second communication module, the transmitting circuit and the receiving circuit are connected between an output end of the low-voltage power supply and the grounding end.

Reference is made to FIG. 2, which is a structural diagram of a multi-chip integrated circuit formed by a chip IC1 and a chip IC2 according to the embodiments of the present disclosure. As shown in FIG. 2, the chip IC1 is connected in series with the chip IC2 to detect multiple batteries, so that a voltage that each chip bears is significantly reduced. In the present disclosure, the adjacent chips communicate with each other through two groups of differential communication ports. That is, the communication ports are configured to transmit a differential signal, so that communication reliability is enhanced while transmitting different signals by setting a voltage difference between each group of communication ports.

Specifically, the chip IC1 includes a first communication module 11 for communicating with an upstream chip of the chip IC1, that is, the chip IC2. The chip IC1 further includes a second communication module 12 for communicating with a downstream chip of the chip IC1. The embodiment of the present disclosure is described based on an integrated circuit including two chips and no chip is arranged downstream of the chip IC1. Therefore, the second communication module 12 is idle in this embodiment. The chip IC2 includes a second communication module 22 for communicating with a downstream chip of the chip IC2, that is, the chip IC1. The chip IC2 further includes a first communication module 21 communicating with an upstream chip of the chip IC2. Since the embodiment of the present disclosure is described based on an integrated circuit including two chips and no chip is arranged upstream of the chip IC2, the first communication module 21 is idle in this embodiment.

The chip IC1 includes two groups of communication ports for communicating with the chip IC2, namely, one group of communication ports including a port TL2H_P and a port TL2H_N for transmitting a differential signal to the chip IC2, and the other group of communication ports including a port RH2L_P and a port RH2L_N for receiving a differential signal transmitted from the chip IC2.

Correspondingly, the chip IC2 includes two groups of communication ports for communicating with the chip IC1, namely, one group of communication ports including a port TH2L_P and a port TH2L_N for transmitting a differential signal to the chip IC1, and the other group of communication ports including a port RL2H_P and a port RL2H_N for receiving a differential signal transmitted from the chip IC1. It can be seen that for two adjacent chips, one of the adjacent chips communicates with the other of the adjacent chips through at least two groups of communication ports.

As shown in FIG. 2, in the chip IC1, the first communication module 11 includes a transmitting circuit TX_L, a receiving circuit RX_L and a low-voltage power supply VR_L. The low-voltage power supply VR_L is configured to supply power to the transmitting circuit TX_L and the receiving circuit RX_L. In the chip IC2, the second communication module 22 includes a transmitting circuit TX_H, a receiving circuit RX_H and a low-voltage power supply VR_H. The low-voltage power supply VR_H is configured to supply power to the transmitting circuit TX_H and the receiving circuit RX_H.

In the chip IC1, the transmitting circuit TX_L transmits a differential signal through the port TL2H_P/TL2H_N to the port RL2H_P/RL2H_N of the chip IC2 according to a predetermined communication protocol. In the chip IC2, the receiving circuit RX_H decodes the signal received through the port RL2H_P/RL2H_N, to complete communication from the chip IC1 to the chip IC2.

Similarly, in the chip IC2, the transmitting circuit TX_H transmits a differential signal through the port TH2L_P/TH2L_N to the port RH2L_P/RH2L_N of the chip IC1 according to a predetermined communication protocol. In the chip IC1, the receiving circuit RX_L decodes the signal received through the port RH2L_P/RH2L_N, to complete communication from the chip IC2 to the chip IC1.

According to the present disclosure, not only two adjacent chips can reliably communicate with each other, but also the voltage difference between communication ports of the two adjacent chips can be reduced. The specific implementation is as follows.

The chip IC1 is connected in series with the chip IC2. Specifically, a grounding end GND of the chip IC2 is connected to a power supply end VCC of the chip IC1. That is, a ground potential of the chip IC2 is connected to a highest potential of the chip IC1.

In the chip IC2, the low-voltage power supply VR_H is a voltage converter, and generates a low voltage VRH relative to the grounding end GND of the chip IC2, that is, VRH is equal to a sum of the voltage at the ground end GND of the chip IC2 and a voltage V2, where the voltage V2 represents the second threshold. The low voltage VRH is configured to supply power to the transmitting circuit TX_H and the receiving circuit RX_H in the chip IC2. Each of the transmitting circuit TX_H and the receiving circuit RX_H is connected between an output end of the low-voltage power supply VR_H and the grounding end GND of the chip IC2.

In the chip IC1, the low-voltage power supply VR_L is a voltage converter, and generates a low voltage VRL relative to a power supply end VCC of the chip IC1, that is, VRL is equal to a difference obtained by subtracting a voltage V1 from the voltage at the power supply end VCC of the chip IC1, where the voltage V1 represents the first threshold. The low voltage VRL is configured to supply power to the transmitting circuit TX_L and the receiving circuit RX_L in the chip IC1. Each of the transmitting circuit TX_L and the receiving circuit RX_L is connected between an output end of the low-voltage power supply VR_L and the power supply end VCC (IC1).

The chip IC2 generates the low voltage VRH relative to the grounding end GND of the chip IC2 for the communication ports, and the chip IC1 generates the low voltage VRL relative to the power supply end VCC of the chip IC1 for the communication ports. Since the grounding end GND of the chip IC2 has the same voltage as the power supply end VCC of the chip IC1, the voltage difference between communication ports of the two adjacent chips is determined by the difference between the low voltage VRH of the chip IC2 and the low voltage VRL of the chip IC1. If an absolute value of the first threshold V1 is equal to an absolute value of the second threshold V2, and both of which are 1.8V, the following equations are obtained in an embodiment.

$$VRH = GND(IC2) + 1.8V.$$

$$VRL = VCC(IC1) - 1.8V.$$

$$VCC(IC1) = GND(IC2).$$

Therefore, a maximum voltage difference between the communication port TL2H_P/TL2H_N and the communication port RL2H_P/RL2H_N, and a maximum voltage difference between the communication port TH2L_P/TH2L_N and the communication port RH2L_P/RH2L_N are equal to 3.6V, that is, VRH−VRL=3.6V. That is, the voltage difference between the communication ports of the two adjacent chips is determined by the sum of the first and second thresholds. In this way, the communication module is completely implemented by a low-voltage circuit and a low-voltage device. Further, electro-static discharge (ESD) protection for corresponding pins is implemented by a low-voltage device, which can not only reduce the cost, but also improve the reliability.

It can be seen that the multi-chip integrated circuit according to the present disclosure includes multiple low-voltage chips that are connected in series instead of an ultra-high voltage chip, so that a voltage that each chip bears is reduced, thereby reducing the requirements on the technology of the chip. In addition, multiple chips communicate with each other through internal communication ports based on the differential signal, so as to enhance the communication reliability. The two adjacent chips are connected in series and the low-voltage power supply is arranged in each chip, so that the voltage difference between communication ports of the two adjacent chips is small.

Figure 3:
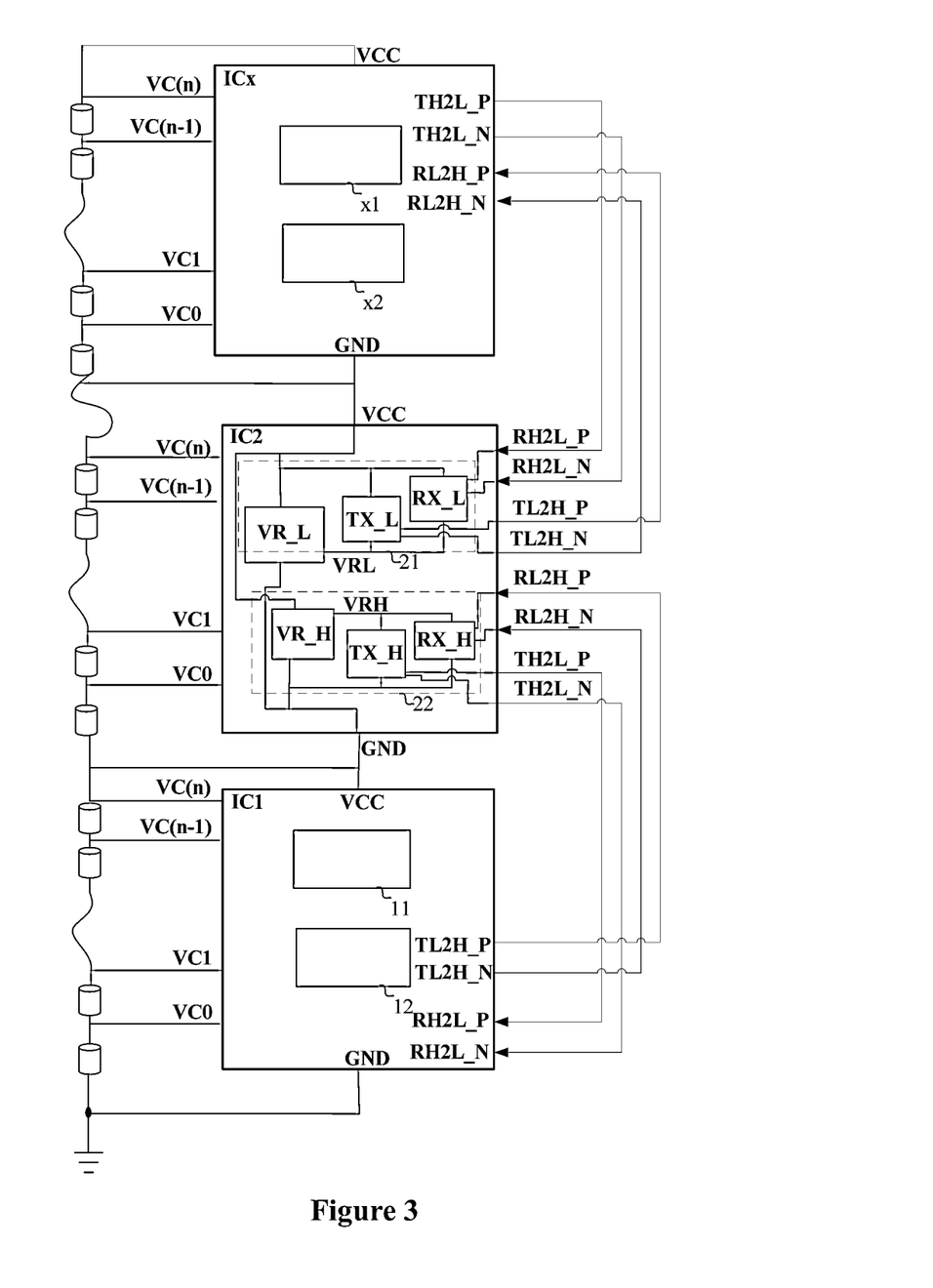
FIG. 3 is a schematic diagram of a second example multi-chip integrated circuit according to the embodiments of the present disclosure.

FIG. 3 is a schematic diagram of a second example multi-chip integrated circuit according to the embodiments of the present disclosure. The second example is different from the first example in that the integrated circuit includes more than two low-voltage chips, for example, x chips, that are connected in series instead of an ultra-high voltage chip. A structure of each of the chips and an interactive communication method of two adjacent chips are the same as those in the embodiment described above.

As shown in FIG. 3, a chip IC1, a chip IC2, . . . , and a chip ICx are connected in series to detect multiple batteries. Each of the chips includes a first communication module for communicating with an upstream chip and a second communication module for communicating with a downstream chip. In addition, a low-voltage power supply of the first communication module and a low-voltage power supply of the second communication module are connected between a power supply end of the chip and a grounding end of the chip.

For example, the chip IC2 includes a first communication module 21 for communicating with a second communication module 32 of a chip IC3 (not shown) arranged upstream of the chip IC2. The chip IC2 further includes a second communication module 22 for communicating with a first communication module 11 of the chip IC1 arranged downstream of the chip IC2. A power supply end VCC of the chip IC2 is connected to a grounding end GND of the chip IC3. A grounding end GND of the chip IC2 is connected to a power supply end VCC of the chip IC1. A low-voltage power supply VR_L in the first communication module 21 of the chip IC2 generates a low voltage VRL relative to the power supply end VCC of the chip IC2, and a low-voltage power supply VR_H in the second communication module 32 of the chip IC3 generates a low voltage VRH relative to the grounding end GND of the chip IC3, so that a maximum voltage difference between communication ports of the chip IC2 and the chip IC3 is controlled to be in a small range. Similarly, each of the low-voltage power supply VR_H in the second communication module 22 of the chip IC2 and the low voltage power supply VR_L in the first communication module 11 generates a low voltage, so that a maximum voltage difference between communication ports of the chip IC2 and the chip IC1 is controlled to be in a small range.

The preferred embodiments of the present disclosure are described above and are not intended to limit the present disclosure. Those skilled in the art can make various modifications and variations to the present disclosure. Any modifications, equivalent substitutions and improvements made within the spirit and the principle of the present disclosure should fall within the protection scope of the present disclosure.

The invention claimed is:

1. A multi-chip integrated circuit, comprising at least two chips connected in series, wherein each of the at least two chips is configured to communicate with at least one adjacent chip through at least a first and a second groups of communication ports, and wherein each of the at least two chips comprises:
 a transmitting circuit corresponding to the first group of communication ports;
 a receiving circuit corresponding to the second group of communication ports; and
 a low-voltage power supply configured to boost or lower a voltage by a threshold to supply power to the transmitting circuit and the receiving circuit, to reduce a voltage difference between corresponding communication ports of the two adjacent chips.

2. The multi-chip integrated circuit according to claim 1, wherein
 the first group of communication ports is configured to transmit a differential signal, and the second group of communication ports is configured to receive a differential signal.

3. The multi-chip integrated circuit according to claim 1, wherein in each of the at least two chips,
 the transmitting circuit of the current chip is configured to transmit a first signal through the first group of communication ports in the current chip, wherein the first signal is received by one corresponding chip adjacent to the current chip through the second group of communication ports in the adjacent chip; and
 the receiving circuit of the current chip is configured to receive a second signal through the second group of communication ports in the current chip, wherein the second signal is transmitted by one corresponding chip adjacent to the current chip through the first group of communication ports in the adjacent chip.

4. The multi-chip integrated circuit according to claim 1, wherein each of the at least two chips comprises:
 a first communication module of the current chip configured to communicate with an upstream chip arranged upstream of the current chip; and
 a second communication module of the current chip configured to communicate with a downstream chip arranged downstream of the current chip, wherein each of the first communication module and the second communication module comprises the transmitting circuit, the receiving circuit and the low-voltage power supply.

5. The multi-chip integrated circuit according to claim 4, wherein
 the transmitting circuit in the first communication module of the current chip is configured to transmit a first signal through the first group of communication ports corresponding to the first communication module to the upstream chip, and the receiving circuit in the first communication module is configured to receive a second signal through the second group of communication ports corresponding to the first communication module from the upstream chip; and
 the transmitting circuit in the second communication module of the current chip is configured to transmit a third signal through the first group of communication ports corresponding to the second communication module to the downstream chip, and the receiving circuit in the second communication module is configured to receive a fourth signal through the second group of communication ports corresponding to the second communication module from the downstream chip.

6. The multi-chip integrated circuit according to claim 1, wherein for two adjacent chips among the at least two chips, a grounding end of an upstream chip is connected to a power supply end of a downstream chip.

7. The multi-chip integrated circuit according to claim 6, wherein the low-voltage power supply in the downstream chip is configured to lower a voltage at a common end between the power supply end of the downstream chip and the grounding end of the upstream chip by a first threshold, and the lower-voltage power supply in the upstream chip is configured to boost a voltage at a common end between the power supply end of the downstream chip and the grounding end of the upstream chip by a second threshold.

8. The multi-chip integrated circuit according to claim 7, wherein a voltage difference between the communication ports of the two adjacent chips is the sum of the first threshold and the second threshold.

9. The multi-chip integrated circuit according to claim 4, wherein
the low-voltage power supply in the first communication module is configured to lower a voltage at a common end between the power supply end of the current chip and the grounding end of the upstream chip by a first threshold; and
the low-voltage power supply in the second communication module is configured to boost a voltage at a common end between the grounding end of the current chip and the power supply end of the downstream chip by a second threshold.

10. The multi-chip integrated circuit according to claim 9, wherein
the transmitting circuit and the receiving circuit in the first communication module are connected between an output end of the low-voltage power supply in the first communication module and the power supply end of the chip; and
the transmitting circuit and the receiving circuit in the second communication module are connected between an output end of the low-voltage power supply in the second communication module and the grounding end of the chip.

11. The multi-chip integrated circuit according to claim 1, wherein
each of the at least two chips is connected to at least one of a plurality of batteries connected in series with each other.

12. An interactive communication method for a multi-chip integrated circuit, comprising:
performing communication, between a first chip and a second chip through at least a first and a second groups of communication ports, wherein
the first chip is connected in series with the second chip, and is adjacent to the second chip;
each of the first chip and the second chip comprises:
a transmitting circuit corresponding to the first group of communication ports;
a receiving circuit corresponding to the second group of communication ports; and
a low-voltage power supply for boosting or lowering a voltage by a threshold to supply power to the transmitting circuit and the receiving circuit, to reduce a voltage difference between corresponding communication ports of the two chips.

13. The interactive communication method according to claim 12, further comprising:
transmitting, from one of the first and second chips, a differential signal to the other of the first and second chips through the first group of communication ports.

14. The interactive communication method according to claim 12, further comprising:
transmitting, by the transmitting circuit in the first chip, a first signal through the first group of communication ports in the first chip; and receiving, by the receiving circuit in the second chip, the first signal through the second group of communication ports in the second chip; and/or
transmitting, by the transmitting circuit in the second chip, a second signal through the first group of communication ports in the second chip; and receiving, by the receiving circuit in the first chip, the second signal through the second group of communication ports in the first chip.

15. The interactive communication method according to claim 12, wherein the first chip is arranged downstream of the second chip, and a grounding end of the second chip is connected to a power supply end of the first chip.

16. The interactive communication method according to claim 15, further comprising:
lowering, by the low-voltage power supply in the first chip, a voltage at a common end between the power supply end of the first chip and the grounding end of the second chip by a first threshold; and
boosting, by the low-voltage power supply in the second chip, a voltage at the common end between the grounding end of the second chip and the power supply end of the first chip by a second threshold.

17. A chip for a multi-chip integrated circuit, comprising:
a first communication module configured to communicate with a chip arranged upstream of the chip;
a second communication module configured to communicate with a chip arranged downstream of the chip, wherein each of the first communication module and the second communication module comprises:
a transmitting circuit;
a receiving circuit; and
a low-voltage power supply configured to boost or lower a voltage by a threshold to supply power to the transmitting circuit and the receiving circuit; and
a first group of communication ports corresponding to the transmitting circuit in the first communication module, a second group of communication ports corresponding to the receiving circuit in the first communication module, a third group of communication ports corresponding to the transmitting circuit in the second communication module, and a fourth group of communication ports corresponding to the receiving circuit in the second communication module.

18. The chip according to claim 17, wherein
each of the first and third groups of communication ports are configured to transmitting a differential signal; and
each of the second and fourth groups of communication ports are configured to transmitting a differential signal.

19. The chip according to claim 17, wherein
the low-voltage power supply in the first communication module is configured to lower a voltage at a power supply end of the chip by a first threshold, to supply power to the transmitting circuit and the receiving circuit in the first communication module; and
the low-voltage power supply in the second communication module is configured to boost a voltage at a grounding end of the chip by a second threshold, to supply power to the transmitting circuit and the receiving circuit in the second communication module.

* * * * *